(12) United States Patent
Nakayama et al.

(10) Patent No.: US 6,392,967 B1
(45) Date of Patent: *May 21, 2002

(54) APPARATUS FOR MEASURING CHARACTERISTICS OF OPTICAL DISC SYSTEMS AND METHOD

(75) Inventors: Akihito Nakayama, UE Square; Kenji Shintani, Singapore, both of (SG); Shunsuke Kohama, Chiba; Yukari Hashimoto, Yokohama, both of (JP)

(73) Assignees: Sony Precision Engineering Center (S) Pte. Ltd., Singapore (SG); Disk Ware Co. Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,643

(22) Filed: Sep. 11, 1998

(30) Foreign Application Priority Data

Sep. 13, 1997 (SG) .............................. 9703387

(51) Int. Cl.[7] .................................................. G11B 7/00
(52) U.S. Cl. ...................................................... 369/44.34
(58) Field of Search ........................... 369/44.29, 44.35, 369/44.34, 50, 54, 53.18, 53.28, 53.31, 53.35, 53.36, 53.37, 47.54, 47.55, 47.35

(56) References Cited

U.S. PATENT DOCUMENTS

| | | | | |
|---|---|---|---|---|
| 5,097,458 A | * | 3/1992 | Suzuki | 369/44.35 |
| 5,142,518 A | * | 8/1992 | Hangai et al. | 369/44.34 |
| 5,251,194 A | * | 10/1993 | Yoshimoto et al. | 369/44.29 |
| 5,253,241 A | * | 10/1993 | Sekiguchi et al. | 369/44.29 |
| 5,481,526 A | * | 1/1996 | Nagata et al. | 369/44.34 |
| 5,485,440 A | * | 1/1996 | Ogino | 369/44.34 |
| 5,606,536 A | * | 2/1997 | Watanabe et al. | 369/44.35 |
| 5,748,584 A | * | 5/1998 | Maezawa | 369/44.34 |
| 5,751,675 A | * | 5/1998 | Tsutsui et al. | 369/44.29 |

* cited by examiner

Primary Examiner—Thang V. Tran
(74) Attorney, Agent, or Firm—Frommer Lawrence & Haug LLP; William S. Frommer (57) ABSTRACT

The characteristic test device 1 supplies the output from the photo detector of the optical pickup 2, as signals A to F, directly to the sample hold circuits 8a–8f. The sample hold circuits 8a–8f, the multiplexer 9, and the second analog/digital converting circuit 10 convert the signals A to F into digital data with the sampling frequency of 50 KHz or more. In the computer 12, the processing division 12d reads out the indicated program from the data storage division 12b, where the program P for measuring the level of RF signal, is stored. The processing division 12d performs the operation of the indicated measurement items, based on the digital data stored in the second memory 11, then measures the characteristic of the optical pickup 2.

17 Claims, 3 Drawing Sheets

APPARATUS FOR MEASURING CHARACTERISTICS OF OPTICAL DISC SYSTEMS AND METHOD

FIELD OF INVENTION

The present invention is directed to a method and device for measuring characteristics of an optical pickup or optical disc. The present invention incorporates a recording and/or reproducing system of optical disc.

BACKGROUND

It is currently known that there has been an inspection device for characteristic of optical pickup, which has been used for optical disc drive. The inspection device for characteristic of optical pickup, for example, is used for shipping inspection (inspection of optical pickup before shipping) or accepting inspection (inspection of optical pickup prior to accepting) of optical pickup, etc. It inspects whether optical pickup satisfies prescribed specifications.

Figure 3:
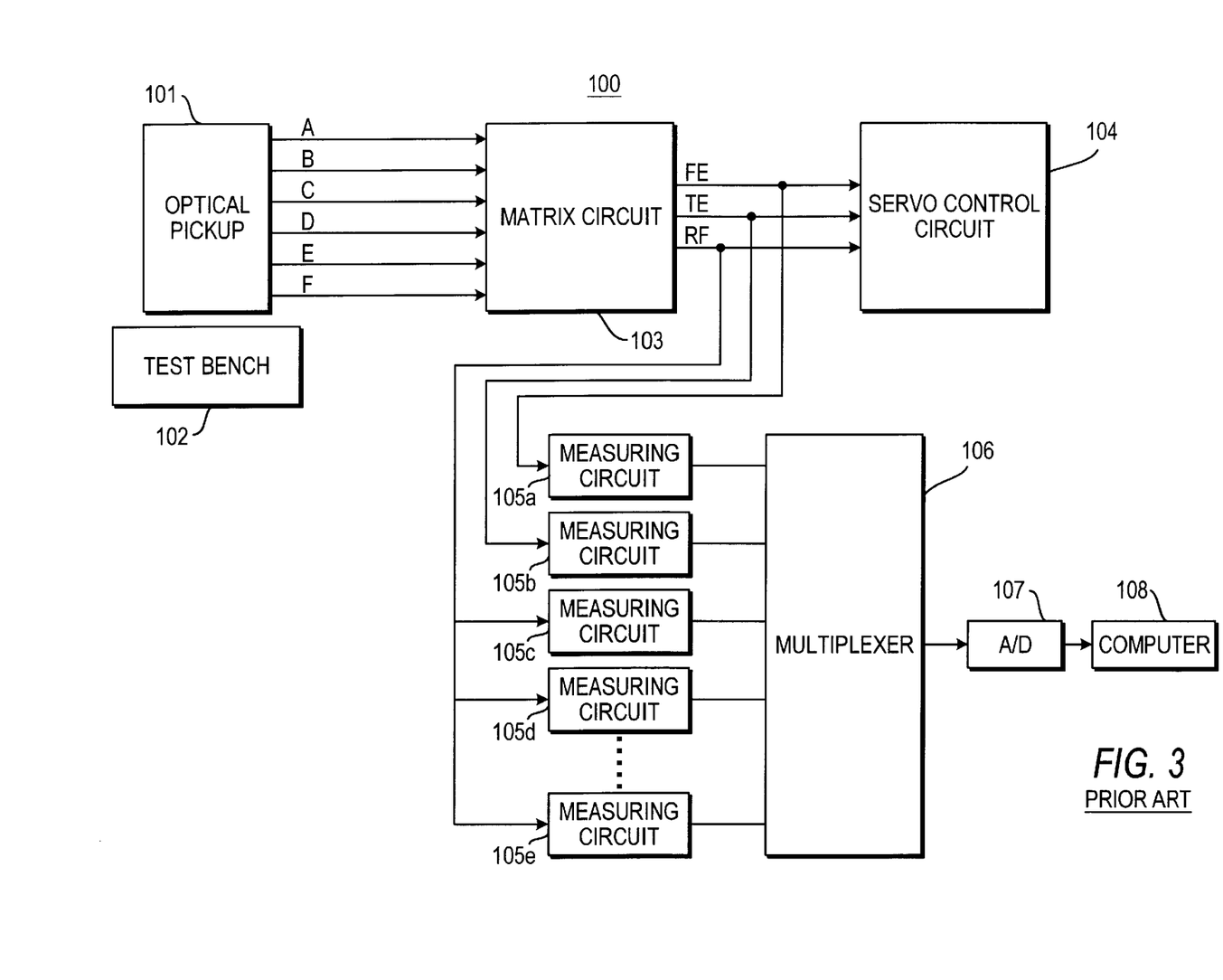
FIG. 3 is a block diagram of the known inspection device for the characteristic of optical pickup.

FIG. 3 shows a block configuration of a known inspection device for characteristic of optical pickup. The inspection device for characteristic of optical pickup 100, shown in the FIG. 3, includes the following: optical pickup 101, which will be an inspection object; test bench 102, where optical disc will be set; matrix circuit 103, to which the output from a photo detector possessed by optical pickup 101, will be provided, and which will output reforming (RF) signals; and servo control circuit 104, which will servo control for the reproducing drive of optical disc, based on the output from the matrix circuit 103.

In addition, the inspection device for characteristic of optical pickup 100, also has the following: measuring circuits 105a–105n, each of which will measure the various values of characteristics of optical pickup, based on the output from the matrix circuit 103; multiplexer 106, which will switch the output from the measuring circuits 105a–105n; analog/digital converting circuit 107, which will convert the output from one of the circuits, which has been converted by internal multiplexer 106 of each measuring circuit 105a–105n, into digital data; and computer 108, which will perform statistical application on the output data from the analog/digital converting circuit 107, and will display the results.

Optical pickup 101 is an inspection object for the inspection device for characteristic of optical pickup 100. This optical pickup 101 can, for example, be installed to the inspection device for characteristic of optical pickup 100, and be freely attached or removed.

The optical pickup 101 also has laser diode, beam splitter, object lens, and photo detector, etc. Furthermore, the optical pickup 101 lets laser emitted from laser diode gather on the optical disc through beam splitter, object lens, etc. Then, the optical pickup 101 lets reflected light from an image on photo detector. The photo detector possessed by the optical pickup 101, is photoelectric conversion element; it converts the reflected light which has formed an image, into electric signals.

In general, the optical pickup 101 has multiple photo detectors: for example, it has a photo detector divided into a quarter in cross-shape; and it also has another photo detector for detecting side spot at both sides of the above photo detector divided into a quarter in cross-shape. The output from such photo detectors will be provided to the matrix circuit 103.

The test bench 102, where optical disc will be set, rotates and drives the optical disc in order to reform the optical disc.

In addition, the optical disc which will be set in the test bench 102, is used as a reference for the inspection device for characteristic of optical pickup 100.

The matrix circuit 103, to which the output from each photo detector possessed by the said optical pickup 101 will be provided, generates reforming (RF) signals, focus error (FE) signals, and tracking error (TE) signals, etc. from the output from such photo detectors.

For example, if photo detectors possessed by the optical pickup 101 consist of the one divided into a quarter in cross-shape and the one used for side spot, the matrix circuit 103 will detect each signal as follows: the matrix circuit 103 processes the total sum of each output, based on the output from the photo detector divided into a quarter, then outputs the result of processing as RF signals. The matrix circuit 103 processes the sums of the output from two (2) photo detectors which are an object at the center of a cross-shape, and processes the difference between these sums, then outputs the result of processing as FE signals. Therefore, the matrix circuit 103 outputs FE signals, by using the astigmatism or astigmatic method. In addition, the matrix circuit 103 processes the difference between the outputs, based on the output from the photo detector used for side spot, then outputs the result of processing as TE signals.

The matrix circuit 103 provides RF signals, FE signals, and TE signals, which are processed as the above mentioned, to servo control circuit 104 and measuring circuits 105a–105n.

The servo control circuit 104 servo-controls as reproducing drive of optical disc, based on the RF signals, FE signals, and TE signals. More specifically, the servo control circuit 104 performs focus servo control, tracking servo control, thread servo control, and tilt servo control.

The measuring circuits 105a–105n operate the characteristics value of the optical pickup 110. Each measuring circuits 105a–105n measures different characteristics values. Therefore, the inspection device for characteristic of optical pickup 100 is equipped with the number of measuring circuits 105a–105n, which are equivalent to the number of the characteristics values to be measured.

Furthermore, each measuring circuits 105a–105n performs filtering processing by analog processing, peak detecting processing, and frequency/voltage conversion processing, and measures characteristics values. The first measuring circuits 105a, for example, measures the level of signals with "S" shaped curve during leading-in of a focus servo loop, based on FE signals. The second measuring circuits 105b, for example, measures the level of TE signal, based on the TE signals. The third measuring circuits 105c, for example, measures the level of RF signal, based on the RF signals. Finally, the forth measuring circuits 105d, for example, measures the jitter component of RF signal, based on the RF signals.

Multiplexer 106 switches the output from each measuring circuits 105a–105n, then supplies the output from either of the measuring circuits to the analog/digital converting circuit 107.

The analog/digital converting circuit 107 converts the output from each measuring circuit 105a–105n, which has been provided through the multiplexer 106, into digital data, then supplies it to the computer 108. The conversion speed of the analog/digital converting circuit 107 is slow, because the output from each measuring circuit 105a–105n is almost at DC level. For example, the conversion speed of the analog/digital converting circuit 107 is about 1 KHz.

The computer 108 performs statistical application on digital data supplied from the analog/digital converting circuit 107, then displays the results.

As we have discussed in the above sections, the current inspection device for characteristic of optical pickup 100 measures the characteristics value of the optical pickup 101, by using the measuring circuits 105a–105n which are equipped to be the same number of the characteristics values to be measured, then displays the results to users, by using the computer 108.

However, the current inspection device for characteristic of optical pickup 100 has measured the characteristics value of the optical pickup 101, by using the multiple measuring circuits 105a–105n through analog processing. Therefore, the current inspection device for characteristic of optical pickup 100 has had a problem that stable characteristics value cannot be obtained, because some effect is generated by uneven characteristics or elapsed change of each measuring circuit 105a–105n. Furthermore, there has been another problem in the current inspection device for characteristic of optical pickup 100: when measuring items of characteristics values should be added or measuring items of characteristics values should be amended, addition or amendment of circuits, in terms of hardware, is necessary for the measuring circuit 105a–105n. This increases cost and needs longer time.

In addition, the current inspection device for characteristic of optical pickup 100 has measured characteristics values based on RF signals, FE signals, or TE signals, which are supplied from the matrix circuit 103. Therefore, the current inspection device for characteristic of optical pickup 100 has had a problem that error caused by temperature characteristics or elapsed change of the matrix circuit 103 influences on the characteristics value to be measured.

Moreover, the current inspection device for characteristic of optical pickup 100 has measured each characteristics value, by using the multiple measuring circuits 105a–105n through analog processing, or has measured characteristics values, based on RF signals, FE signals, or TE signals, which are supplied from the matrix circuit 103. This causes a problem for a system which uses multiple number of the inspection device for characteristic of optical pickup 100: the results of measurement by each device vary, and it is difficult to correct such unevenness.

SUMMARY OF THE INVENTION

According to the present invention, there is provided a device for measuring characteristics of an optical pickup comprising a reproducing drive and a photoelectric conversion section, wherein the device comprises:

servo control means for controlling the reproducing drive;

analog to digital conversion means for converting analog data output from the photoelectric conversion section to a digital data output;

storage means for storing digital data output from the analog to digital conversion means; and processing means for determining characteristics of the optical pickup based upon the digital data stored in the storage means.

The analog to digital conversion means may sample the output from the photoelectric conversion section at a frequency of 50 kHz or greater.

The photoelectric conversion section may comprise a plurality of outputs; and the analog to digital conversion means may simultaneously sample the plurality of outputs of the photoelectric conversion section.

The analog to digital conversion means may further comprise a plurality of sample hold circuits.

The plurality of sample hold circuits may simultaneously sample the plurality of outputs of the photoelectric conversion section to produce a digital data output.

The processing means may perform an adjustment to the servo control means in accordance with the characteristics of the optical pickup.

The processing means may determine the characteristics of the optical pickup after each the adjustment of the servo control means.

The processing means may adjust the tracking balance, tracking bias or defocus of the servo control means in accordance with the characteristics of the optical pickup.

The optical pickup may comprise an optical disk.

According to another aspect of the invention, there is provided a method of measuring characteristics of an optical pickup comprising a reproducing drive and a photoelectric conversion section, wherein the method comprises the steps of:

sampling a plurality of outputs from the photoelectric conversion section to produce sample data;

converting the sample data into digital data;

storing the digital data in a storage device;

processing the digital data stored in the storage device to determine characteristic of the optical drive; and adjusting a servo control means to control the reproducing drive in accordance with the characteristic of the optical drive.

The step of sampling a plurality of outputs from the photoelectric conversion section may be preformed at a frequency of 50 KHz or greater.

The sampling step may further comprise simultaneously sampling the plurality of outputs from the photoelectric conversion section to produce sample data.

The sampling step may further comprise simultaneously sampling the plurality of outputs from the photoelectric conversion section to produce sample data using a plurality of analog to digital conversion circuits.

The sampling step and converting step may be performed by a plurality of sample hold circuits.

The adjusting step may further comprise adjusting tracking balance, tracking bias or defocus of the servo control means.

The processing step may be repeated after the adjusting step.

According to a further aspect of the invention, there is provided an optical disk recording/reproducing system comprising:

reproducing drive for rotating an optical disk at a predetermined rate;

optical pickup comprising a plurality of photoelectric conversion sections;

servo control means for controlling the reproducing drive based upon an output signal from the plurality of photoelectric conversion sections;

analog to digital conversion means for converting the output from the photoelectric conversion sections into digital data;

storage means for storing the digital data;

processing means to determine characteristics of the optical pickup based upon the digital data stored in the storage means; and the processing means further comprises means for controlling the servo controller means based upon the digital data stored in the storage means.

BRIEF DESCRIPTION OF THE DRAWINGS

In order that the invention might be more fully understood, embodiments of the invention will be described, by way of example only, with reference to the accompanying drawings, in which.

DETAILED DESCRIPTION OF EMBODIMENTS OF THE INVENTION

In the following sections, embodiments of the present invention will be explained with reference to the drawings. The measuring device for characteristic of optical pickup (hereinafter "characteristic test device") inspects the characteristic of optical pickup, which is used for optical disc drive. Such characteristic test device is adopted in the specification test of optical pickup or research on the characteristic of optical pickup: for example, it is adopted in shipping test or acceptance test of optical pickup.

Figure 1:
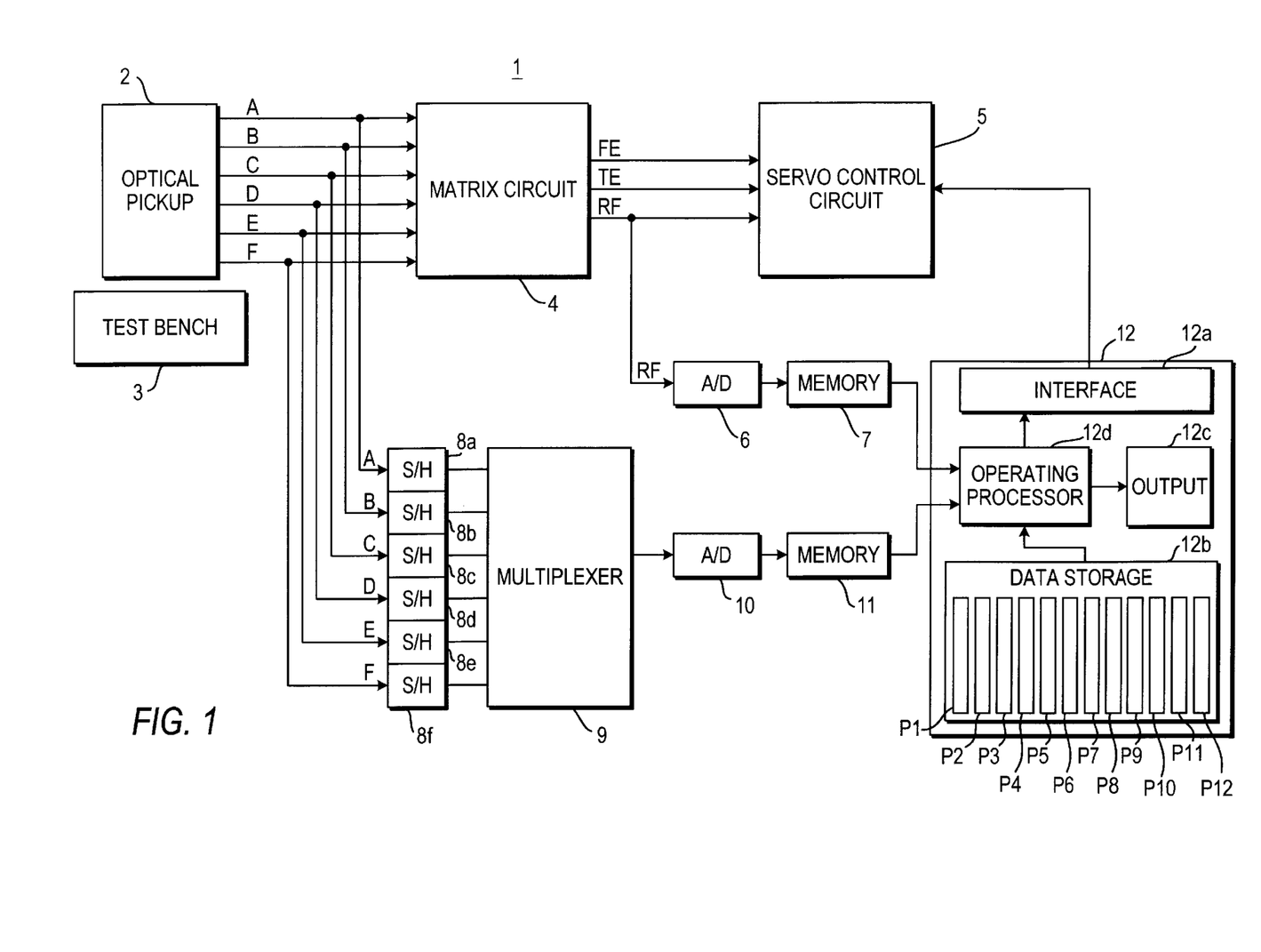
FIG. 1 is a block diagram describing the application of an embodiment of invention, the measuring device for characteristic of optical pickup.

FIG. 1 shows a block diagram describing the application of an embodiment of the invention, the characteristic test device. The characteristic test device 1, as shown in the FIG. 1, has the following features: optical pickup 2, which will be a test object; test bench 3, where optical disc will be set; matrix circuit 4, to which the output from a photo detector possessed by optical pickup 2, will be provided, and which will output reforming (RF) signals; and servo control circuit 5, which will servo control for the reproducing drive of optical disc, based on the output from the matrix circuit 4.

In addition, this characteristic test device 1 also has the following: the first analog/digital converting circuit 6, which will convert RF signals from the matrix circuit 4 into digital data; and the first memory 7, which temporarily stores the output from the first analog/digital converting circuit 6.

Furthermore, this characteristic test device 1 also has the following: Sample hold circuits No.1 to No.6, 8a–8f, which will sample hold each output possessed by the optical pickup 2; multiplexer 9, which will switch the output from the sample hold circuits No.1 to No.6, 8a–8f; the second analog/digital converting circuit 10, which will convert the output from the sample hold circuits No.1 to No.6, 8, which has been converted by multiplexer 9, into digital data; and the second memory 11, which temporarily stores the output from the second analog/digital converting circuit 10.

Moreover, this characteristic test device 1 has computer 12, which will process the characteristic value of optical pickup 2 or display the result of the processing, based on the digital data temporarily stored in the first memory 7 and the second memory 11, and will control the servo control circuit 5, based on the result of the processing.

Optical pickup 2 is an inspection object for the characteristic test device 1. This optical pickup 2 can, for example, be freely attached to or removed from the characteristic test device 1. The optical pickup 2 also has laser diode, beam splitter, object lens, and photo detector, etc. Furthermore, the optical pickup 2 lets laser emitted from laser diode gather on the optical disc through beam splitter, object lens, etc. Then, the optical pickup 2 lets reflection light from an image on photo detector. The photo detector possessed by the optical pickup 2, is photoelectric conversion element; it converts the reflection light which has formed an image, into electric signals.

Figure 2:
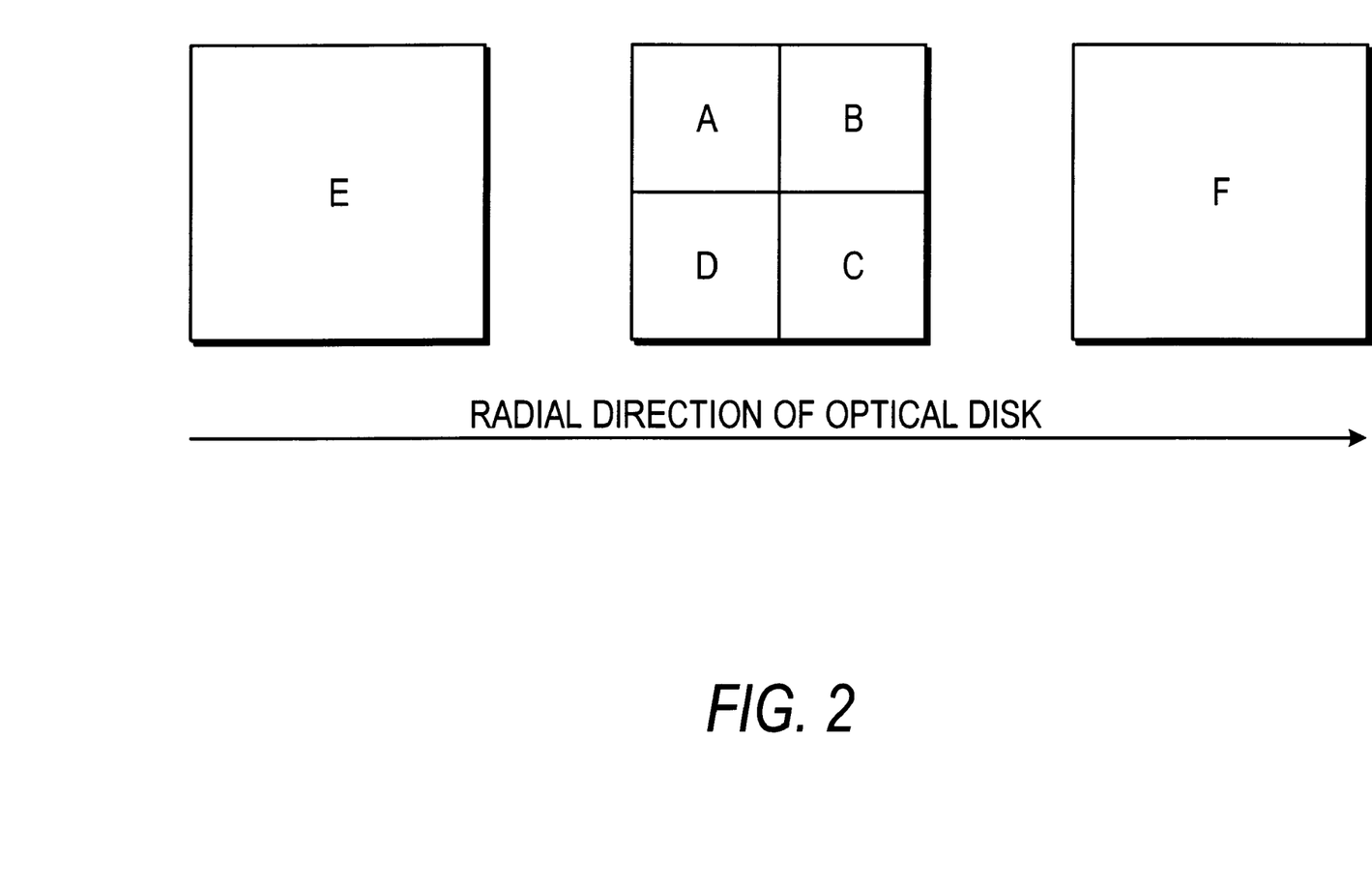
FIG. 2 illustrates an example of the photo detector equipped with the optical pickup, which is a test object of the above measuring device for characteristic of optical pickup.

The optical pickup 2 has multiple photo detectors. FIG. 2 shows an example of multiple photo detectors which are equipped with the optical pickup 2. For example, as shown in FIG. 2, the optical pickup 2 has 4 photo detectors A to D which are arrayed in the shape of 2×2 matrix, and photo detectors E and F for side spot inspection at both sides of the photo detectors A to D which are arrayed in such a manner. Such photo detectors A to F are, for example, adopted in optical pickup with the so-called three-spot method, in which three shots of laser will be emitted to optical disc. Main beam, which will be a center light in the three-spot method, shall be irradiated to the photo detectors A to D. In other words, reflection light against memory bit recorded in the tracks of optical disc, shall be irradiated to the photo detectors A to D. The photo detectors E and F are radially installed at both sides of the photo detectors A to D. Side beam in the three-spot method shall be irradiated to the photo detectors E and F. For example, light reflected from an edge, for example, of tracks of the optical disc shall be irradiated to these photo detectors E and F.

Each photo detectors A to F converts the quantity of irradiated reflection light into signals A to F. The optical pickup 2 supplies each of the signals A to F to the matrix circuit 4. In addition, the optical pickup 2 supplies signal A to the first sample hold circuit 8a, signal B to the second sample hold circuit 8b, signal C to the third sample hold circuit 8c, signal D to the fourth sample hold circuit 8d, signal E to the fifth sample hold circuit 8e, and signal F to the sixth sample hold circuit 8f.

The test bench 3, where optical disc will be set, rotates and drives the optical disc in order to reform the optical disc. In addition, the optical disc which will be set in the test bench 3, is used as a reference for the characteristic test device 1, namely, the characteristic test device 1 measures the characteristic of the optical pickup 2, based on the regenerative signal of the optical disc which is used as a reference for the characteristic test device 1.

The matrix circuit 4, to which the signals A to F, the output from each photo detector A to F possessed by the said optical pickup 2 will be supplied, and generates reforming (PF) signals, focus error (FE) signals, and tracking error (TE) signals, based on the signals A to F. For example, the matrix circuit 4, based on the signals A to F, generates RF signals, FE signals, and TE signals, as follows: the matrix circuit 4, based on the signals A to D, processes A+B +C+D, then generates RF signal; also, the matrix circuit 4, based on the signals A to D, processes (A+C)−(B+D), then outputs the processing result as FE signal: that is, the matrix circuit 4 outputs FE signal, based on the astigmatism, or astigmatic, method. Matrix circuit 4, based on the signals E and F, processes E-F, then outputs the processing result as TE signal. The matrix circuit 4 supplies RF signals, FE signals, and TE signals, which have been processed in the above manner, to the servo control circuit 5. Also, the matrix circuit 4 supplies RF signals to the first analog/digital converting circuit 6.

The servo control circuit 5, servo-controls during reproducing drive of optical disc, based on RF signals, FE signals, and TE signal. Specifically, the servo control circuit 5, based on RF signals, drives a biaxial actuator, which operates the object lens of the optical pickup 2, until the FE signal reaches 0, and performs focus servo control. The servo control circuit 5, based on TE signals, drives a biaxial actuator, which operates the object lens of the optical pickup 2, until the TE signal reaches 0, and performs tracking servo control. The servo control circuit 5, detects DC component of FE signals, and performs thread servo control, until the DC component becomes 0. Also, the servo control circuit 5, based on RF signals,,performs tilt servo control, which controls the inclination of optical disc. Further, it is also good for the servo control circuit 5 to perform tilt servo control, with installing separate structure for detecting the inclination of optical disc.

The first analog/digital converting circuit 6 converts RF signal supplied from the matrix circuit 4 into digital data, at high-speed sampling frequency, for example, at the sampling frequency of about 30 MHz. The first analog/digital converting circuit 6 supplies RF signal, which has been converted into digital data, to the first memory 7. The first memory 7 temporarily stores the RF signal converted into digital data by the first analog/digital converting circuit 6.

To each sample hold circuit 8a–8f, respectively, signal A to F, which are the output signals of photo detector, are supplied from the optical pickup 2. Each sample hold circuit 8a–8f simultaneously performs hold processing on signal A to F with an identical clock. The clock supplied to these sample hold circuits 8a–8f, for example, are with frequency 50 KHz or more. Therefore, sample hold circuits 8a–8f repeat performing sample processing and hold processing, in a cycle of the clock with frequency 50 KHz or more.

Multiplexer 9 switches the output from the sample hold circuits 8a–8f, and supplies either of such hold output to the second analog/digital converting circuit 10. The multiplexer 9 has properly high switching speed, which is enough to supply every hold output from the sample hold circuits 8a–8f to the second analog/digital converting circuit 10 within 1 clock. The switching speed of the multiplexer 9 will become more than six (6) times of 50 KHz, if, for example, the sample hold circuits 8a–8f repeat performing sampling processing and hold processing in a cycle of the clock with frequency 50 KHz or more.

The second analog/digital converting circuit 10 converts each output from the sample hold circuits 8a–8f, which are supplied through the multiplexer 9, into digital data; then, it supplies the digital data to the second memory 11. The second analog/digital converting circuit 10 has a converting speed which is enough to convert every hold output from the sample hold circuits 8a–8f within 1 cycle of the clock, which is supplied to the sample hold circuits 8a–8f. The second analog/digital converting circuit 10 will perform conversion at converting speed of more than 30 KHz, if for example, the sample hold circuits 8a–8f repeat performing sample processing and hold processing in a cycle of the clock with frequency 50 KHz or more, because there are six (6) sample hold circuits, 8a–8f.

The sample hold circuits 8a–8f, the multiplexer 9, and the second analog/digital converting circuit 10, which are described in the above, convert signal A to F, which are the output from each photo detector of the optical pickup 2, respectively and independently. In addition, the sample hold circuits 8a–8f, the multiplexer 9, and the second analog/digital converting circuit 10, convert signal A to F into digital data at sampling frequency of 50 KHz, for example.

The means to convert signal A to F, which are the output signals of photo detector from the optical pickup 2, is not necessarily limited to the configuration of above mentioned sample hold circuits 8a–8f, the multiplexer 9, and the second analog/digital converting circuit 10. For example, for the characteristic test device 1, it is acceptable to have a configuration in which six (6) rows of the analog/digital converting circuit with sampling frequency of 50 KHz arrays in parallel.

The second memory 11 temporarily stores the signal A to F from the optical pickup 2, which are converted into digital data by the second analog/digital converting circuit 10. Computer 12 has interface division 12a; data storage division 12b; output division 12c; and processing division 12d, etc. The interface division 12a outputs control signals, which is for controlling the servo control circuit 5, toward the servo control circuit 5. The data storage division 12b stores various processing programs which correspond to each measuring item of the optical pickup 2 in the characteristic test device 1. The output division 12c displays the results of measuring the characteristic of the optical pickup 2.

The processing division 12d of the computer 12, reads out the RF signals, which have been converted into digital data and stored in the first memory 7, then detects jitter component of the RF signals, based on the read-out data. In addition, the processing division 12d of the computer 12, reads out the RF signals, which have been converted into digital data and stored in the second memory 11, then processes according to each measuring item, and measures the characteristic of the optical pickup 2.

Furthermore, the processing division 12d of the computer 12 also performs the following processing on the data stored in the first memory 7 and the second memory 11, when it processes according to each measuring item: For example, the processing division 12d performs filter operation; peak level operation; operation for computing waveform period; operation for computing phase difference between two signals; signal extract operation by level window; signal extract operation by periodic window; and operation for computing voltage AC component and DC component of signals.

Next, we will indicate explain measuring items of the characteristic test device 1, and explain their processing contents. In order to inspect the characteristic of the optical pickup 2, the characteristic test device 1 determines (measures): level of RF signal (P1); $I_{TOP}$ and $I_{BOTTOM}$ (P2) of RF signal; Jitter of RF signal (P3); Beam position of main beam (P4); level of TE signal (P5); E-F balance (P6); E-F phase difference (P7); S-shaped level (P8); S-shaped Balance (P9); Defocus (P10); Cross talk (P11); Non point aberration (P12).

Processing programs of the above determined items are stored in the data storage division 12b, as processing programs P1–P2. Based on setting of user, the processing division 12d reads out the processing programs P1–P2 according to the measuring items from the data storage division 12b; then performs operations on the data stored in the first memory 7 and the second memory 11. We would mention that each processing programs P1–P2 measure the above items, by using the operations stated in the previous section: filter operation; peak level operation; operation for computing waveform period; operation for computing phase difference between two signals; signal extract operation by level window; signal extract operation by periodic window; and operation for computing voltage AC component and DC component of signals.

In case of measuring the level of RF signal, first, the processing division 12d reads out the digital data which corresponds to the signals A to D, from the second memory 11. Second, the processing division 12d computes the total sum of each read-out signals A to D, then performs operation for computing voltage AC component, based on the said total sum. Third, the processing division 12d outputs the result of computing as the result of measuring the level of RF signal. That is, the processing division 12d reproduces RF signal out of the output from each photo detector, using digital operations, then performs operation for measuring the AC component of the reproduced RF signal.

In the case of measuring the level of RF signal, the processing division 12d controls the servo control circuit 5 through the interface division 12a, and performs the measurement with being both focus servo and tracking servo on. In the case of measuring $I_{TOP}$ and $I_{BOTOM}$ of RF signal, first, the processing division 12d reads out the digital data which corresponds to the signals A to D, from the second memory 11. Second, the processing division 12d computes the total sum of each read-out signals A to D, then performs peak level operation, based on the said total sum. Third, the processing division 12d outputs the peak level which generates at anode side, as $I_{TOP}$, and that cathode side as $I_{BOTOM}$. That is, the processing division 12d reproduces RF signal out of the output from each photo detector, using digital operations, then performs operation for measuring the peak value at anode side and that at cathode side, which are synthesized AC component and DC component of the reproduced RF signal.

In the case of measuring $I_{TOP}$ and $I_{BOTOM}$ of RF signal, the processing division 12d controls the servo control circuit 5 through the interface division 12a, and performs the measurement with being both focus servo and tracking servo on.

In case of measuring jitter component of RF signal, first, the processing division 12d reads out RF signal which sampled by the first analog/digital converting circuit 6, from the first memory 7. In this case, the first analog/digital converting circuit 6 performs sampling at sampling frequency of 30 MHz, for examples. Second, the processing division 12d computes the slice level of RF signal based on the above data, and computes the time point by interpolation, at which RF signal reaches the indicated slice level, based on the digital data adjoining the above slice level and the sampling frequency of the first analog/digital converting circuit 6. Finally, the processing division 12d computes each time breadth between the time points at which RF signal reaches the indicated slice level, and computes the jitter component of regenerative signal, based on each time breadth.

In the case of measuring jitter component of RF signal, the processing division 12d controls the servo control circuit 5 through the interface division 12a, and performs the measurement with being both focus servo and tracking servo on.

In the case of measuring the beam position of main beam, first, the processing division 12d reads out the digital data which corresponds to the signals A to D, from the second memory 11. Second, the processing division 12d computes each difference between each signal, based on each signal A to D, then computes where on the photo detector A to D shown in FIG. 2 the center position of the reflection light of main beam is irradiated. Third, the processing division 12d outputs the irradiation position of main beam on the photo detectors as the result of measurement. That is, the processing division 12d computes the quantity of light of main beam, which is irradiated on each photo detector, for each photo detector, then detects the irradiation position of main beam.

In the case of measuring the beam position of main beam, the processing division 12d controls the servo control circuit 5 through the interface division 12a, and performs the measurement with being both focus servo and tracking servo on.

In the case of measuring the level of TE signal, first, you will let the optical pickup 2 forcibly operate toward the radial direction of the optical disc. The processing division 12d reads out the digital data which corresponds to the signals E and F at this time, from the second memory 11. Second, the processing division 12d computes difference between the signal E and the signal F, then computes the peak level which generates at anode side, and that at cathode side, based on the signal obtained from the difference. Third, the processing division 12d outputs the result of computing as the result of measuring the level of TE signal. That is, the processing division 12d reproduces the TE signal out of the output from each photo detector, using digital operations, then performs operation of measuring the peak value of the reproduced TE signal.

We would further mention that in case of measuring the level of TE signal, the processing division 12d controls the servo control circuit 5 through the interface division 12a, and performs the measurement with being focus servo ON and tracking servo OFF.

In the case of measuring E-F balance, first, you will let the optical pickup 2 forcibly operate toward the radial direction of the optical disc. Second, the processing division 12d reads out the digital data which corresponds to the signals E and F at this time, from the second memory 11. Third, the processing division 12d computes the reference level at which the difference equals 0, based on the read-out difference between the signal E and the signal F. Fourth, the processing division 12d computes the ratio of deflection: that means, toward which side, anode side or cathode side, the difference between the signal E and the signal F leans as against the reference level. Finally, the processing division 12d outputs the result of computing as the result of measuring E-F balance. That is, the processing division 12d reproduces the TE signal out of the output from each photo detector, using digital operations, then performs operation of measuring the ratio of plus or minus as against the reference level of the reproduced TE signal.

In the case of measuring E-F balance, the processing division 12d controls the servo control circuit 5 through the interface division 12a, and performs the measurement with being focus servo ON and tracking servo OFF.

In the case of measuring E-F phase difference, first, you will let the optical pickup 2 forcibly operate toward the radial direction of the optical disc. Second, the processing division 12d reads out the digital data which corresponds to the signals E and F at this time, from the second memory 11. Third, the processing division 12d computes the phase difference between the signal E and the signal F. Finally, the processing division 12d outputs the phase difference as the result of measuring E-F balance. That is, the processing division 12d measures the phase difference of the output from the photo detector for two (2) side spot, which are used in generating the TE signal.

In the case of measuring E-F phase difference, the processing division 12d controls the servo control circuit 5 through the interface division 12a, and performs the measurement with being focus servo ON and tracking servo OFF.

In case of measuring S-shaped level, first, you will let the optical pickup 2 forcibly move up and down. Second, the processing division 12d reads out the digital data which corresponds to the signals A to D at this time, from the second memory 11. Third, the processing division 12d computes (A+C)−(B+D) from each signal A to D, then computes the peak value at anode side and the peak value at cathode side. Finally, the processing division 12d outputs the result of the computation. That is, the processing division 12d reproduces the FE signal out of the output from each photo detector, using digital operations, then performs operation of measuring the peak value of the reproduced FE signal.

In the case of measuring E-F phase difference, the processing division 12d controls the servo control circuit 5 through the interface division 12a, and performs the measurement with being both focus servo and tracking servo OFF.

In the case of measuring S-shaped balance, first, you will let the optical pickup 2 forcibly move up and down. Second, the processing division 12d reads out the digital data which corresponds to the signals A to D at this time, from the second memory 11. Third, the processing division 12d computes (A+C)−(B+D) from each signal A to D, then computes the reference level at which the value equals 0. Fourth, the processing division 12d computes the ratio of deflection: that means, toward which side, anode side or cathode side, the wave shape of (A+C)−(B+D) leans as against the reference level. Finally, the processing division 12d outputs the result of computing as the result of measuring the S-shaped balance. That is, the processing division 12d reproduces the FE signal out of the output from each photo detector, using digital operations, then performs operation of measuring the ratio of plus or minus as against the reference level of the reproduced FE signal.

We would further mention that in the case of measuring S-shaped balance, the processing division 12d controls the servo control circuit 5 through the interface division 12a, and performs the measurement with being both focus servo and tracking servo OFF.

In the case of measuring the level of Defocus, first, the processing division 12d reads out the digital data which corresponds to the signals A to D, from the second memory 11. Second, the processing division 12d computes the total sum of each read-out signals A to D. That is, reproduces RF signals. Third, the processing division 12d detects jitter component out of the RF signals reproduced in the digital operation. Fourth, the processing division 12d measures defocus condition of main beam, based on the result of detected jitter component. Namely, a factor of the jitter component, for example, is the case in which the main beam is not focused on the photo detector. Therefore, the processing division 12d reproduces the RF signal out of the output from each photo detector, using digital operations, and measures the jitter component from the reproduced RF signal, then measures the quantity of offset at which the jitter component becomes minimum. In the case of measuring S-shaped balance, the processing division 12d controls the servo control circuit 5 through the interface division 12a, and performs the measurement with being both focus servo and tracking servo ON.

In the case of measuring the cross talk, first, you will let the optical pickup 2 forcibly operate toward the radial direction of the optical disc. Second, the processing division 12d reads out the digital data which corresponds to the signals A to D at this time, from the second memory 11. Third, the processing division 12d computes the total sum of the read-out signals A to D, that is, it reproduces RF signals. Fourth, the processing measures maximum and minimum of the reproduced RF signal. Fifth, the processing division 12d computes the ratio of the maximum to the minimum and outputs the result. That is, the processing division 12d compares a level of RF signal at the position in which the reflection light of main beam becomes the maximum, namely, it is ON-track, to a level of RF signal at the position in which the reflection light of main beam becomes the minimum, namely, it is OFF-track. Then, based on the ratio, it measures the condition of cross talk during reproduction.

We would further mention that in case of measuring E-F phase difference, the processing division 12d controls the servo control circuit 5 through the interface division 12a, and performs the measurement with being focus servo ON and tracking servo OFF.

In the case of measuring the non point aberration, first, you will let the optical pickup 2 forcibly move up and down. Second, the processing division 12d reads out the digital data which corresponds to the signals A to D at this time, from the second memory 11. Third, the processing division 12d computes (A+C)−(B+D) from the read-out A to D, then computes the total sum of the read-out signals A to D at the position in which the computed value equals to 0. Fourth, the processing division 12d controls the servo control circuit 5, adds an indicated offset quantity to the controlled variable of tracking servo, and move the position of main beam being irradiated to the photo detector to the radial direction of disc. Fifth, again, the processing division 12d computes (A+C)−(B+D) from the read-out A to D, then computes the total sum of the read-out signals A to D at the position in which the computed value equals to 0. The processing division 12d repeat the above procedures to measure the offset quantity for the tracking control by which the best RF signal can be obtained.

We would further mention that in case of measuring the non point aberration, the processing division 12d controls the servo control circuit 5 through the interface division 12a, and performs the measurement with being focus servo and OFF. In addition, the processing division 12d performs measurement while it repeats to switch tracking servo from ON to OFF, or vice versa.

As discussed in the above sections, the processing division 12d can perform measurement of each items, regarding the characteristics of the optical pickup 2. Further, the processing division 12d can perform re-measurement of the characteristics of the optical pickup 2, by doing feedback of the measurement results in each measurement item to the servo control circuit 5. For example, the processing division 12d supplies the result of measuring E-F balance, which was stated in the above, to the servo control circuit 5. The servo control circuit 5 performs adds the offset quantity, which has been obtained in the above result of measuring E-F balance, to the controlled variable, then performs tracking servo control. Once again, the processing division 12d measures E-F balance under this condition.

Furthermore, for example, the processing division 12d supplies the result of measuring defocus, which was stated in the above, to the servo control circuit 5. The servo control circuit 5 performs adds the offset quantity, which has been obtained in the above result of measuring defocus, to the controlled variable, then performs focus servo control.

Once again, the processing division 12d measures defocus under this condition. As we have discussed here, the characteristic test device 1 can obtain more precise measurement result, by conducting the feedback of the measurement result and re-measurement of each measurement item.

The following is an explanation of the measurement result of the case in which the sampling speed is changed to convert the output from photo detector into digital data, and measure TE level and E-F balance. Table 1 shows the result of measuring TE level and E-F balance of a compact disc by using the characteristic test device 1, when we change sampling speed to convert the output from photo detector into digital data up to 1.5625 KHz to 100 KHz.

TABLE 1

| Sampling Speed (Hz) | TE Level (p-pv) | E–F Balance |
|---|---|---|
| 100K | 0.576763 | 0.004108 |
| 50K | 0.569560 | −0.001275 |
| 25K | 0.564137 | −0.002126 |
| 12.5K | 0.458384 | −0.004119 |
| 6.25K | 0.324225 | −0.019516 |
| 3.125K | 0.210161 | −0.048872 |
| 1.5625K | operation impossible | operation impossible |

As Table 1 shows, the characteristic test device 1 can perform stable measurement, if the sampling speed is 50 KHz or more. As discussed so far, the characteristic test device 1 measures the characteristics of the optical pickup 2, by directly converting the signals A to F, which are the output signals from the photo detector of the optical pickup 2, into digital data. Therefore, the characteristic test device 1 can perform stable measurement, without being influenced by unevenness in initial characteristic or elapsed change of the servo control circuit 5.

Furthermore, when the characteristic test device 1 makes addition or amendment of measurement items, it can do so only by amending processing programs. Thus, since no addition or amendment of circuits in terms of hardware is needed, thus yielding a savings in cost and time.

In addition, when measuring the characteristics of the optical pickup 2 by using the system which adopts the multiple characteristic test device 1, you can easily make correction among devices, and unevenness in the measurement results among each device would not be generated.

The characteristic test device 1 to measure the characteristics of the optical pickup 2 have now been explained. However, it is possible to apply the characteristic test device 1 to the characteristic test device for optical disc. That is, the characteristic test device 1, which was described in the previous sections, uses an optical disc which is set in the test bench 3, as its reference; if you use optical pickup as its reference, you can measure the characteristics of the optical disc.

In addition, the optical pickup 2 which is to be measured by the characteristic test device 1, has measured the signal A to F, by using the photo detector shown in FIG. 2; however, adoption of this invention is not limited only to a such type of optical pickup. For example, it is possible to apply it to the optical pickup which is used in optical pickup used for optical magnetic disc or phase change disc. In such cases, since the configuration of the photo detector will be generally different from the one explained in FIG. 2, the number of the sample hold circuits 8a to 8f or the second analog/digital conversion circuit 10 will correspond to the number of the photo detector. Also, if in case of optical magnetic disc, since the regenerative signal will be a difference signal which uses Kerr effect, it will be the program in which the processing contents performed in the processing division 12d will correspond to the difference signal.

Furthermore, the optical pickup 2 which is to be measured by the characteristic test device 1, can be not the one in which the object lens is installed as one body, but so-called photo coupler, which has light-emitting device, prism, and light receiving element on a semiconductor board. In such a case, the photo coupler can be freely attached to and removed from the characteristic test device 1, and the object lens is equipped to the device.

Moreover, the invention may be adopted to the recording and/or reproducing system of optical disc, which has the sample hold circuits 8a–8f, the multiplexer 9, the second analog/digital converting circuit 10, the first memory 7, and the processing division 12d, and performs feedback of the measurement result of each item, then records and reproduce the signals under the optimized reproducing or recording conditions.

That means, such the recording and/or reproducing system of optical disc is equipped with not only usual circuit configuration of optical disc, but also the analog/digital converting circuit to which the output from the photo detector of the optical pickup is directly supplied, and the processing division which computes the characteristics of the regenerative signal, based on the output from the analog/digital converting circuit.

The processing division, for example, consists of digital signal processor. It measures on Item or the indicated multiple items among each measurement item, which was discussed in the previous sections, based on the above output data from the analog/digital converting circuit. The processing division, based on the measurement result, controls the regenerative circuit so that the servo characteristic or the regenerative characteristic of the recording and/or reproducing system is optimized. Then the recording and/or reproducing system of optical disc can regenerate the optical disc under the optimized regenerative condition.

The measuring device for characteristic of optical pickup and/or optical disc, regarding an embodiment of this invention, directly converts the output from one or more photoelectric conversion sections which are held by optical pickup, into digital data. Then, based on the said digital data, the measuring device for characteristic of optical pickup and/or optical disc operates one or more characteristic values of the optical pickup and/or optical disc.

Because of the above feature, the measuring device for characteristic of optical pickup and/or optical disc can perform stable measurement, without being influenced by unevenness in initial characteristic or elapsed change.

Furthermore, the measuring device for characteristic of optical pickup and/or optical disc can easily make addition or amendment of measurement items. Thus, since no addition or amendment of circuits in terms of hardware is needed, you can save your cost and quickly finish such activities.

In the measuring method for characteristic of optical pickup and/or optical disc, regarding an embodiment of this invention, it directly converts the output from one or more photoelectric conversion sections which are held by the said optical pickup into digital data. Then, in the said measuring method for characteristic of optical pickup and/or optical disc, based on the said digital data, it operates one or more characteristic values of the optical pickup and/or optical disc.

Because of the above feature, by the measuring method for characteristic of optical pickup and/or optical disc, you can perform stable measurement, without being influenced by unevenness in initial characteristic or elapsed change.

Furthermore, by the measuring method for characteristic of optical pickup and/or optical disc, you can easily make addition or amendment of measurement items. Thus, since no addition or amendment of circuits in terms of hardware is needed, you can save your cost and quickly finish such activities.

The recording and/or reproducing system of optical disc, regarding an embodiment of this invention, directly converts directly converts the output from one or more photoelectric conversion sections which are held by the said optical pickup into digital data. Then, the said recording and/or reproducing system of optical disc, based on the said digital data, operates one/or more characteristic values of the optical pickup and/or optical disc, and controls the characteristic of the said servo control.

The recording and/or reproducing system of optical disc, regarding an embodiment of this invention can regenerate the optical disc under the optimized regenerative condition. In the reproducing methods of optical disc, it directly converts the output from one or more photoelectric conversion sections which are held by the said optical pickup, into digital data. Then, in the said reproducing methods of optical disc, based on the said digital data, it operates one or more characteristic values of the optical pickup and/or optical disc, and controls the characteristic of the said servo control.

In the reproducing methods of optical disc, it operates one or more characteristic values of the optical pickup and/or optical disc, and controls the characteristic of the said servo control.

In summary, the measuring device for characteristic of optical pickup and/or optical disc, regarding a typical embodiments of this invention, has the following features: servo control means controlling reproducing drive of optical disc, based on the output from one or more photoelectric conversion sections which are held by optical pickup; analog/digital conversion means converting the output from one or more photoelectric conversion sections which are held by the said optical pickup into digital data; storage means which stores digital data converted by the said analog/digital conversion means; and processing means which operates the value of characteristics of the said optical pickup and/or optical disc, based on the digital data stored by the said storage means.

The measuring device for characteristic of optical pickup and/or optical disc directly converts the output from one or more photoelectric conversion sections which are held by optical pickup into digital data. Then, based on the said digital data, the measuring device for characteristic of optical pickup and/or optical disc operates one or more characteristic values of the optical pickup and/or optical disc.

In addition, the measuring device for characteristic of optical pickup and/or optical disc, regarding an embodiment this invention, has a feature that the analog/digital conversion means samples the said output from photoelectric conversion sections, at the 50 KHz or above.

Furthermore, the measuring device for characteristic of optical pickup and/or optical disc, regarding an embodiment of this invention, has a feature that the said analog/digital conversion means simultaneously sample the multiple output from photoelectric conversion sections, then convert them into digital data.

Moreover, the measuring device for characteristic of optical pickup and/or optical disc, regarding an embodiment of this invention, has a feature that the said processing means correct the controlling features of the said servo control means, based on the computed value of characteristics of the said optical pickup and/or optical disc.

The measuring method for characteristic of optical pickup and/or optical disc, regarding an embodiment of this invention, has the following features: it servo controls the reproducing drive of optical disc, based on the output from one or more photoelectric conversion sections which are held by optical pickup; as well as it converts the output from one or more photoelectric conversion sections which are held by the said optical pickup into digital data; it stores the converted digital data; and it operates the value of characteristics of the said optical pickup and/or optical disc, based on the stored digital data.

In the said measuring method for characteristic of optical pickup and/or optical disc, it directly converts the output from one or more photoelectric conversion sections which are held by the said optical pickup into digital data. Then, in the said measuring method for characteristic of optical pickup and/or optical disc, based on the said digital data, it operates one or more characteristic values of the optical pickup and/or optical disc.

In addition, the measuring method for characteristic of optical pickup and/or optical disc, regarding an embodiment of this invention, has the following feature: it samples the said output from photoelectric conversion sections, at the 50 KHz or above.

Furthermore, the measuring method for characteristic of optical pickup and/or optical disc, regarding an embodiment of this invention, has the following feature: it simultaneously samples the multiple output from photoelectric conversion sections, then converts them into digital data.

Moreover, the measuring method for characteristic of optical pickup and/or optical disc, regarding an embodiment of this invention, has the following feature: it corrects and servo controls the controlling features of reproducing drive, based on the computed value of characteristics of the said optical pickup and/or optical disc.

The recording and/or reproducing system of optical disc, regarding an embodiment of this invention, has the following features: optical pickup which has one or more photoelectric conversion sections; and servo control means controlling reproducing drive of optical disc, based on the output from the said photoelectric conversion sections; and analog/digital conversion means converting the output from one or more photoelectric conversion sections which are held by the said optical pickup into digital data; and storage means which stores digital data converted by the said analog/digital conversion means; and processing means Which operates the value of characteristics of the said optical pickup and/or optical disc, and controls the said servo control means, based on the digital data stored by the said storage means.

The recording and/or reproducing system of optical disc, regarding an embodiment of this invention, directly converts directly converts the output from one or more photoelectric conversion sections which are held by the said optical pickup into digital data. Then, the said recording and/or reproducing system of optical disc, based on the said digital data, operates one or more characteristic values of the optical pickup and/or optical disc, and controls the characteristic of the said servo control.

The reproducing methods of optical disc, regarding an embodiment of this invention, has the following features: it servo controls and reproduces the reproducing drive of optical disc, based on the output from one or more photoelectric conversion sections which are held by optical pickup; as well as it converts the output from one or more photoelectric conversion sections which are held by the said optical pickup into digital data; and it stores the converted digital data; and it operates the value of characteristics of the said optical pickup and/or optical disc, based on the stored digital data, and it controls the characteristics of the said servo control, based on the computed value of characteristics.

In the reproducing methods of optical disc, regarding an embodiment of this invention, it directly converts the output from one or more photoelectric conversion sections which are held by the said optical pickup into digital data. Then, in the said reproducing methods of optical disc, based on the said digital data, operates one or more characteristic values of the optical pickup and/or optical disc, and controls the characteristic of the said servo control.

The foregoing description of embodiments of the invention has been presented for purposes of illustration and description and is not intended to be exhaustive or limit the invention to the precise form disclosed herein. In view of the above teachings, obvious modifications or variations will be apparent to those skill in the art. All such modifications and variations are fully contemplated by the inventor and are within the scope of the invention as determined by the appended claims when interpreted in accordance with the breadth to which they are fairly, legally and equitably entitled.

What is claimed is:

1. A device for measuring characteristics of an optical pickup, said optical pickup including at least one actuator, a reproducing drive for driving said at least one actuator, and a photoelectric conversion section having a plurality of photo detectors for converting light received by said pickup into electrical signals, said device comprising:

an analog to digital converter for simultaneously converting into digital data electrical signals output directly from said photo detectors;

a memory for storing said digital data;

a processor for determining characteristics of said optical pickup by implementing programs which perform calculations on said digital data, said processor including a memory for storing said programs; and a servo control circuit for receiving said characteristics from said processor, and for controlling said reproducing drive according to at least one of said characteristics.

2. A device for measuring characteristics of an optical pickup according to claim 1, wherein said analog to digital converter samples said output from said plurality of photo detectors at a frequency of 50 kHz or greater.

3. A device for measuring characteristics of an optical pickup according to claim 1, wherein said photo detectors comprises a plurality of outputs; and said analog to digital converter simultaneously samples said plurality of outputs of said photo detectors.

4. A device for measuring characteristics of an optical pickup according to claim 3, wherein said analog to digital converter further comprises a plurality of sample hold circuits.

5. A device for measuring characteristics of an optical pickup according to claim 3, wherein said plurality of sample hold circuits simultaneously sample said plurality of outputs of said photo detectors to produce digital data.

6. A device for measuring characteristics of an optical pickup according to claim 1, wherein said processor performs an adjustment to said servo control circuit in accordance with said characteristics of said optical pickup.

7. A device for measuring characteristics of an optical pickup according to claim 6, wherein said processor determines said characteristics of said optical pickup after each said adjustment of said servo control circuit.

8. A device for measuring characteristics of an optical pickup according to claim 7, wherein said processor adjusts the tracking balance, tracking bias or defocus of said servo control circuit in accordance with said characteristics of said optical pickup.

9. A device for measuring characteristics of an optical pickup according to claim 1, wherein said optical pickup comprises an optical disk.

10. A method of measuring characteristics of an optical pickup, said optical pickup including at least one actuator, a reproducing drive for driving said at least one actuator, and a photoelectric conversion section having a plurality of photo detectors for converting light received by said optical pickup into electrical signals, said method comprising the steps of:

simultaneously converting into digital data said electrical signals output directly from said photo detectors;

storing said digital data in a memory;

determining characteristics of said optical pickup by implementing programs in a processor which performs calculations on said digital data, said processor including a memory for storing said programs;

receiving said characteristics from said processor at a servo control circuit; and controlling said reproducing drive according to at least one of said characteristics.

11. A method of measuring characteristic an optical pickup according to claim 10, further comprising the step of sampling a plurality of outputs from said photo detectors at a frequency of 50 kHz or greater.

12. A method of measuring characteristics of an optical pickup according to claim 10, further comprising the step of sampling said plurality of outputs from said photo detectors to produce sampling data.

13. A method of measuring characteristics of an optical pickup according to claim 12, further comprising the step of sampling said plurality of outputs from said photo detectors to produce sample data using a plurality of analog to digital converters.

14. A method of measuring characteristics of an optical pickup according to claim 12, wherein said sampling step and converting step are performed by a plurality of sample hold circuits.

15. A method of measuring characteristics of an optical pickup according to claim 10, further comprising the step of adjusting tracking balance, tracking bias, or defocus of said servo control circuit.

16. A method of measuring characteristics of an optical pickup according to claim 15, further comprising the step of repeating said determining step after said adjusting step.

17. An optical disk recording/reproducing system comprising:

an optical pickup including at least one actuator, a reproducing drive for driving said at least one actuator, and a photoelectric conversion section having a plurality of photo detectors for converting light received by said optical pickup;

an analog to digital converter for simultaneously converting into digital data electrical signals output directly from said photo detectors;

a memory for storing said digital data;

a processor for determining characteristics of said optical pickup by implementing programs which perform calculations on said digital data, said processor including a memory for storing said programs; and a servo control circuit for receiving said characteristics from said processor, and for controlling said reproducing drive according to at least one of said characteristics.

* * * * *